(12) United States Patent
Hogge et al.

(10) Patent No.: US 6,838,028 B2
(45) Date of Patent: Jan. 4, 2005

(54) METHOD OF MAKING A GOLF BALL VAPOR BARRIER LAYER

(75) Inventors: Matthew F. Hogge, Mattapoisett, MA (US); Mitchell E. Lutz, Fairhaven, MA (US)

(73) Assignee: Acushnet Company, Fairhaven, MA (US)

(*) Notice: Subject to any disclaimer, the term of this patent is extended or adjusted under 35 U.S.C. 154(b) by 132 days.

(21) Appl. No.: 10/367,491

(22) Filed: Feb. 14, 2003

(65) Prior Publication Data

US 2003/0171163 A1 Sep. 11, 2003

Related U.S. Application Data

(62) Division of application No. 09/973,342, filed on Oct. 9, 2001, now Pat. No. 6,632,147.

(51) Int. Cl.[7] .................... B29C 39/10; B29C 41/18; B29C 41/20
(52) U.S. Cl. .................. 264/140; 264/250; 264/254; 264/299
(58) Field of Search ................ 264/128, 138, 264/140, 241, 250, 254, 255, 271.1, 299, 302; 473/377, 378

(56) References Cited

U.S. PATENT DOCUMENTS

| | | | |
|---|---|---|---|
| 2,356,128 A | 8/1944 | Thomas et al. ............. 260/79 |
| 3,099,644 A | 7/1963 | Parker et al. ............. 260/85.3 |
| 3,241,834 A | 3/1966 | Stingley ................ 273/58 |
| 3,313,545 A | 4/1967 | Bartsch ................ 273/218 |
| 3,642,728 A | 2/1972 | Canter ................ 260/79.3 R |
| 3,989,568 A * | 11/1976 | Isaac ................ 156/182 |
| 4,123,061 A | 10/1978 | Dusbiber ............... 273/220 |
| 4,165,425 A | 8/1979 | Bertozzi ................ 528/374 |
| 4,209,485 A | 6/1980 | Greespan ............... 264/242 |
| 4,229,337 A | 10/1980 | Brenner ............... 260/32.6 A |
| 4,234,705 A | 11/1980 | Matoba ................ 525/329 |
| 4,239,799 A | 12/1980 | Weinberg et al. ........... 428/335 |
| 4,263,078 A | 4/1981 | Millen et al. ........... 156/244.11 |
| 4,264,075 A * | 4/1981 | Miller et al. ................ 473/372 |
| 4,356,676 A | 11/1982 | Hauptman ............... 52/403 |
| 4,863,167 A | 9/1989 | Matsuki et al. ............. 273/62 |
| 4,995,613 A | 2/1991 | Walker ................ 273/183 |
| 5,184,828 A | 2/1993 | Kim et al. ............... 273/228 |
| 5,468,527 A | 11/1995 | Peiffer et al. ............. 428/35.7 |
| 5,506,014 A | 4/1996 | Minnick ................ 428/35.7 |
| 5,562,393 A | 10/1996 | Focke et al. ............. 427/493 |
| 5,677,362 A | 10/1997 | Bachmann et al. ........... 522/28 |
| 5,685,785 A | 11/1997 | Kakiuchi et al. ........... 473/354 |
| 5,755,628 A | 5/1998 | Kakiuchi et al. ........... 473/354 |
| 5,779,562 A | 7/1998 | Melvin et al. ............. 473/373 |
| 5,820,488 A | 10/1998 | Sullivan et al. ............. 473/374 |
| 5,873,796 A | 2/1999 | Cavallaro et al. ........... 473/365 |
| 5,875,891 A | 3/1999 | Snell ................ 206/315.9 |
| 5,882,567 A | 3/1999 | Cavallaro et al. ........... 264/255 |
| 5,885,172 A | 3/1999 | Hebert et al. ............... 473/354 |
| 5,908,358 A | 6/1999 | Wu ................ 473/378 |
| 5,919,100 A | 7/1999 | Boehm et al. ............. 473/354 |
| 5,965,669 A | 10/1999 | Cavallaro et al. ........... 525/221 |
| 6,010,412 A | 1/2000 | Moriyama ................ 473/373 |
| 6,030,296 A | 2/2000 | Morgan et al. ............. 473/361 |
| 6,045,460 A | 4/2000 | Hayashi et al. ............. 473/376 |
| 6,062,283 A | 5/2000 | Watanabe et al. ........... 152/510 |
| 6,066,054 A | 5/2000 | Masutani ................ 473/374 |
| 6,106,415 A | 8/2000 | Masutani et al. ........... 473/374 |
| 6,113,505 A | 9/2000 | Boehm ................ 473/357 |
| 6,117,024 A | 9/2000 | Dewanjee ................ 473/351 |
| 6,123,628 A * | 9/2000 | Ichikawa et al. ........... 473/371 |
| 6,126,558 A | 10/2000 | Higuchi et al. ............. 473/374 |
| 6,132,324 A | 10/2000 | Hebert et al. ............... 473/378 |
| 6,135,898 A | 10/2000 | Higuchi et al. ............. 473/374 |
| 6,142,888 A | 11/2000 | Higuchi et al. ............. 473/374 |
| 6,174,388 B1 | 1/2001 | Sikka et al. ............... 148/512 |
| 6,180,715 B1 | 1/2001 | Schmidt ................ 524/611 |
| 6,200,511 B1 | 3/2001 | Peiffer et al. ............. 264/176.1 |
| 6,232,389 B1 | 5/2001 | Feeney et al. ............. 524/450 |
| 6,334,919 B1 | 1/2002 | Takeyama et al. ........... 156/123 |
| 6,342,567 B2 | 1/2002 | Minagawa et al. ........... 525/192 |
| 6,346,571 B1 | 2/2002 | Dharmarajan et al. ........ 525/72 |
| 6,746,345 B2 * | 6/2004 | Higuchi et al. ............. 473/371 |
| 6,746,347 B2 * | 6/2004 | Higuchi et al. ............. 473/378 |

FOREIGN PATENT DOCUMENTS

| WO | WO 00/23519 | 4/2000 |
|---|---|---|
| WO | WO 01/29129 | 4/2001 |

\* cited by examiner

Primary Examiner—Angela Ortiz
(74) Attorney, Agent, or Firm—William B. Lacy

(57) ABSTRACT

A method of casting a portion of a golf ball comprising the steps of providing a single component that is blocked and stable at a first predetermined temperature and becomes unblocked at a second predetermined temperature, wherein said second predetermined temperature is higher than the first predetermined temperature; and reacting said single component at the second predetermined temperature to form the surrounding layer.

12 Claims, 3 Drawing Sheets

METHOD OF MAKING A GOLF BALL VAPOR BARRIER LAYER

CROSS-REFERENCE TO RELATED APPLICATIONS

This application is a divisional of U.S. application Ser. No. 09/973,342, filed Oct. 9, 2001 now U.S. Pat. No. 6,632,147.

FIELD OF THE INVENTION

The present invention relates to a novel structure for a golf ball, and more particularly to a golf ball with a moisture vapor barrier layer.

BACKGROUND OF THE INVENTION

Solid core golf balls are well known in the art. Typically, the core is made from polybutadiene rubber material, which provides the primary source of resiliency for the golf ball. U.S. Pat. Nos. 3,241,834 and 3,313,545 disclose the early work in polybutadiene chemistry. It is also known in the art that increasing the cross-link density of polybutadiene can increase the resiliency of the core. The core is typically protected by a cover from repeated impacts from the golf clubs. The golf ball may comprise additional layers, which can be an outer core or an inner cover layer. One or more of these additional layers may be a wound layer of stretched elastic windings to increase the ball's resiliency.

A known drawback of polybutadiene cores cross-linked with peroxide and/or zinc diacrylate is that this material is adversely affected by moisture. Water moisture vapor reduces the resiliency of the cores and degrades its properties. A polybutadiene core will absorb water and loose its resilience. Thus, these cores must be covered quickly to maintain optimum ball properties. The cover is typically made from ionomer resins, balata, and urethane, among other materials. The ionomer covers, particularly the harder ionomers, offer some protection against the penetration of water vapor. However, it is more difficult to control or impart spin to balls with hard covers. Conventional urethane covers, on the other hand, while providing better ball control, offer less resistance to water vapor than ionomer covers.

Prolonged exposure to high humidity and elevated temperature may be sufficient to allow water vapor to invade the cores of some commercially available golf balls. For example at 110° F. and 90% humidity for a sixty day period, significant amounts of moisture enter the cores and reduce the initial velocity of the balls by 1.8 ft/s to 4.0 ft/s or greater. The change in compression may vary from 5 PGA to about 10 PGA or greater. The absorbed water vapor also reduces the coefficient of restitution (COR) of the ball.

Several prior patents have addressed the water vapor absorption problem. U.S. Pat. No. 5,820,488 discloses a golf ball with a solid inner core, an outer core and a water vapor barrier layer disposed therebetween. The water vapor barrier layer preferably has a water vapor transmission rate lower than that of the cover layer. The water vapor barrier layer can be a polyvinylidene chloride (PVDC) layer. It can also be formed by an in situ reaction between a barrier-forming material and the outer surface of the core. Alternatively, the water vapor barrier layer can be a vermiculite layer. U.S. Pat. Nos. 5,885,172 and 6,132,324 disclose, among other things, a golf ball with a polybutadiene or wound core with an ionomer resin inner cover and a relatively soft outer cover. The hard ionomer inner cover offers some resistance to water vapor penetration and the soft outer cover provides the desirable ball control. It is also desirable to minimize the water barrier layer such that other properties of the ball are unaffected. Additionally, U.S. Pat. No. 5,875,891 discloses an impermeable packaging for golf balls. The impermeable packaging acts as a moisture barrier limiting moisture absorption by golf balls during storage.

However, there remains a need for other golf balls with an improved water vapor barrier layer and improved methods for applying a water vapor barrier layer on to the core of the golf ball.

SUMMARY OF THE INVENTION

The present invention is directed to a golf ball comprising a thin film of moisture vapor barrier with a moisture vapor transmission rate preferably lower than that of the cover and more preferably less than or equal to that of an ionomer resin. The moisture vapor barrier may also comprise nano particles, flaked-metals, such as mica, iron oxide and aluminum, or ceramic particles disposed in the film to resist the transmission of moisture into the core.

The present invention is also directed to a golf ball comprising a soft, high specific gravity layer. Preferably, this layer also has a low moisture vapor transmission rate to decrease the amount of moisture penetrating into the core of the golf ball. The high specific gravity layer advantageously contributes to a high moment of inertia, low spin ball.

The present invention is also directed to a golf ball comprising a moisture vapor barrier, which can be a multi-layer thermoplastic film, a blend comprising ionomers, polyvinyl alcohol copolymer and polyamides, or a dispersion of acid salts of polyetheramines.

In accordance to another aspect of the invention, the moisture vapor barrier can be an intermediate layer, an inner cover layer, an outer core layer, a core coating or an outer cover coating.

The present invention is also directed to a golf ball having a moisture vapor barrier layer with a solid core and intermediate wound layer(s). The moisture vapor barrier layer is preferably applied to a wound layer and penetrates into the interstitial spaces in the wound layer(s) to minimize the transmission of moisture vapor to the intermediate wound layer(s) and to the core. Each of the wound layers is preferably made up of a material that is chemically, mechanically and physically different than an adjacent wound layer.

The present invention is also directed to a golf ball having a thin moisture vapor barrier layer with a thin thermoset urethane cover. Alternatively, the cover layer may be a relatively thick layer. The thick cover allows more spin, feel, control and playability for greenside play.

The present invention is also directed to a method of making a golf ball with a moisture vapor barrier layer. In accordance to one aspect of the present invention, any layer of the golf ball can be made by a single component casting method. Preferably, this single component casting method utilizes uretdione or isocyanate blocked materials, and is, therefore, stable at a predetermined low temperature. However, this material becomes deblocked at a predetermined elevated temperature and reacts to form the moisture vapor barrier layer or other components of the ball.

In accordance to another aspect of the invention, the thin moisture vapor barrier layer can also be manufactured by a two-component castable system. Preferably, two distinct castable components are mixed and react with each other prior to casting to form the moisture vapor barrier layer. The moisture vapor barrier layer may also be formed by spraying, dipping, preformed semi-cured shells, compression molding of sheet stock, injection molding, reaction injection molding or other methods.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
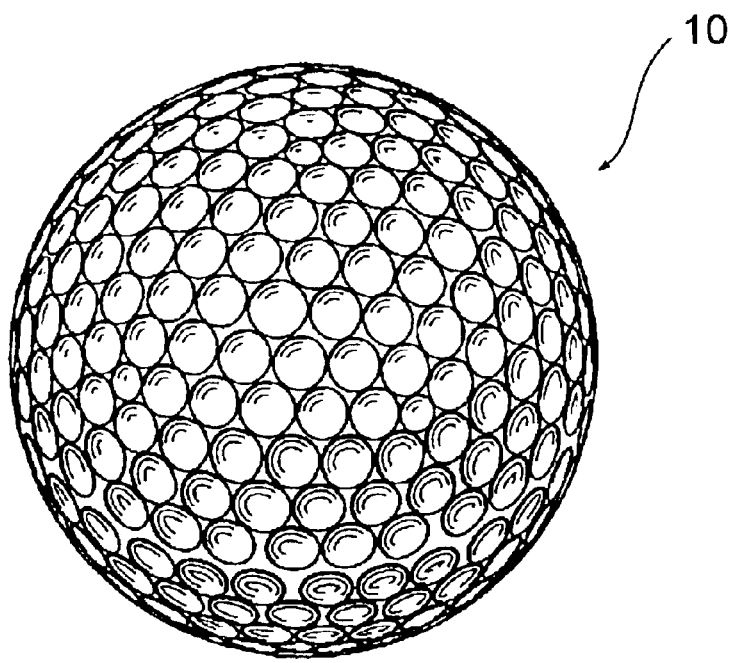
FIG. 1 is a front view of a dimpled golf ball in accordance to the present invention.
Figure 2:
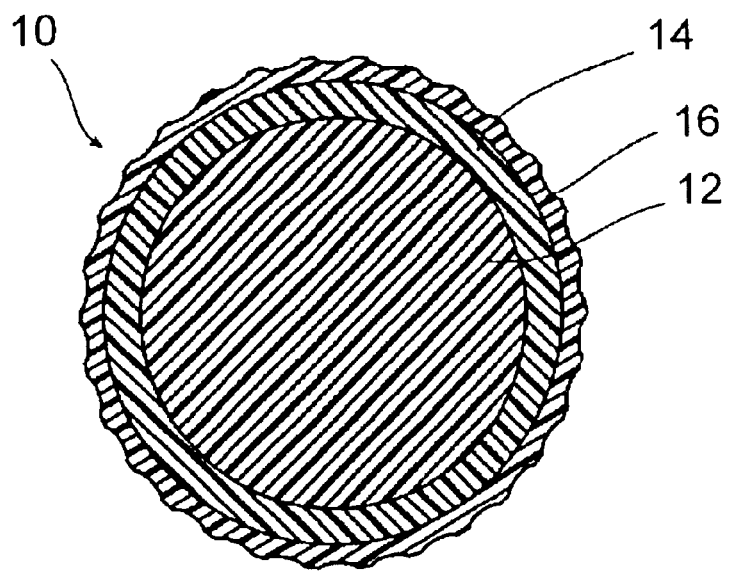
FIG. 2 is a cross-sectional view of the golf ball in FIG. 1 showing a solid core surrounded by a thin moisture vapor barrier layer and a cover.

As shown generally in FIGS. 1 and 2, where like numbers designate like parts, reference number 10 broadly designates a golf ball in accordance to the present invention. Golf ball 10 preferably has a solid core 12, an intermediate layer 14 and a cover 16. Solid core 12 may comprise a single spherical element, or it may comprise a core spherical element with one or more intermediate layers surrounding the spherical element. Solid core 12 can be made from any suitable core materials including thermoset plastics, such as natural rubber, polybutadiene (PBD), polyisoprene, styrene-butadiene or styrene-propylene-diene rubber, and thermoplastics such as ionomer resins, polyamides, polyesters, or a thermoplastic elastomer. Suitable thermoplastic elastomers include Pebax®, Hytrel®, thermoplastic urethane, and Kraton®, which are commercially available from Elf-Atochem, E.I. Du Pont de Nemours and Company, various manufacturers, and Shell Chemical Company, respectively. The core materials can also be formed from a castable material. Suitable castable materials include those comprising a urethane, polyurea, epoxy, silicone, IPN's, etc.

Additionally, suitable core materials may also include a reaction injection molded polyurethane or polyurea, including those versions referred to as nucleated, where a gas, typically nitrogen, is essentially whipped into at least one component of the polyurethane, typically, the pre-polymer, prior to component injection into a closed mold where essentially full reaction takes place resulting in a cured polymer having reduced specific gravity. These materials are referred to as reaction injection molded (RIM) materials.

Cover 16 is preferably tough, cut-resistant, and selected from conventional materials used as golf ball covers based on the desired performance characteristics. The cover may comprise one or more layers. Suitable cover materials include ionomer resins, such as Surlyn® available from DuPont, blends of ionomer resins, thermoplastic or thermoset urethane, acrylic acid, methacrylic acid, thermoplastic rubber polymers consisting of block copolymers in which the elastomeric midblock of the molecule is an unsaturated rubber or a saturated olefin rubber, e.g., Kraton® rubbers available from Shell Chemical Co., polyethylene, and synthetic or natural vulcanized rubber such as balata.

Additionally, other suitable core and cover materials are disclosed in U.S. Pat. No. 5,919,100 and international publications WO 00/23519 and WO 01/29129. These disclosures are incorporated by reference in their entirety. Preferably, core 12 is made from a polybutadiene rubber material and cover 16 is made from a composition comprising a thermoset or thermoplastic urethane or a composition comprising an ionomer resin.

To prevent or minimize the penetration of moisture, typically water vapor, into core 12 of golf ball 10, intermediate layer 14 is a moisture vapor barrier layer preferably disposed immediately around core 12. Preferably, moisture vapor barrier layer 14 has a moisture vapor transmission rate that is lower than that of the cover, and more preferably less than the moisture vapor transmission rate of an ionomer resin such as Surlyn®, which is in the range of about 0.45 to about 0.95 grams·mm/m$^2$·day. The moisture vapor transmission rate is defined as the mass of moisture vapor that diffuses into a material of a given thickness per unit area per unit time. The preferred standards of measuring the moisture vapor transmission rate include ASTM F1249-90 entitled "Standard Test Method for Water Vapor Transmission Rate Through Plastic Film and Sheeting Using a Modulated Infrared Sensor," and ASTM F372-99 entitled "Standard Test Method for Water Vapor Transmission Rate of Flexible Barrier Materials Using an Infrared Detection Technique," among others.

In accordance to an aspect of the invention, moisture vapor barrier layer 14 also has micro particles disposed therein. These particles are preferably hydrophobic and create a more tortuous path across the moisture vapor barrier layer 14 to reduce the moisture transmission rate of the layer 14. The micro particles may include nano particles, ceramic particles, flaked glass, and flaked metals (e.g., micaceous materials, iron oxide or aluminum).

In accordance to an embodiment of the invention, the moisture vapor barrier layer 14 is a thin and soft rubber layer. Layer 14 preferably has a specific gravity that is significantly higher than the specific gravity of core 12 to produce a high moment of inertia ball with a low rate of moisture vapor transmission. An exemplary material for layer 14 contains polybutadiene, a cross-linking agent, a free radical source and high specific gravity fillers. An example of such polybutadiene-based material is as follows:

100 parts polybutadiene polymer,

5–10 parts metal acrylate or methacrylate cross-linking agent, 5 parts zinc oxide as the density modifying material, 2 parts dicumyl peroxide as the free radical source, and X part(s) metal powder filler, such as tungsten or other heavy metals, where X depends on the desired specific gravity of the batch and where X is a number, including integers and real numbers. Alternatively, butyl-based or natural rubbers are also suitable primary ingredients, due to their low moisture vapor transmission rates. A preferred metal acrylate is zinc diacrylate. Other suitable primary ingredients include, but are not limited to, trans polyisoprene, neoprene, chlorinated polyethylene, balata, acrylics, etc.

Preferably, a golf ball in accordance to the present invention comprises a solid or multiple-layer solid core 12 having an outer diameter of greater than about 1.50 inches, more preferably 1.550 inches and most preferably 1.580 inches. Moisture vapor barrier layer 14 is preferably less than about 0.030 inch thick and cover 16 is a urethane cover with sufficient thickness to produce a 1.680 inch diameter golf ball. Golf balls were produced in accordance to the preferred dimensions and formulation discussed above. More specifically, cores with 1.550 inch diameter were produced with reduced specific gravity fillers to yield a core specific gravity of about 1.05. Thin sheets of moisture vapor barrier stock material with specific gravity of about 1.50 were placed around the core. Sub-assemblies of core and stock were compression molded for about 30 minutes at about 330° F. These sub-assemblies were compared against control cores without the moisture vapor barrier layer. The following results were obtained.

| | Diameter (inch) | Compression (PGA) | Hardness (Shore D) | Moment of Inertia (g · cm$^2$) | COR (at 125 ft/sec) | COR Slope |
|---|---|---|---|---|---|---|
| Core (1.550 inch) | 1.550 | 77 | 46 | N/A | 0.807 | −.00105 |
| Core with Thin Moisture Barrier Layer | 1.620 | 77 | 36 | 71.6 | 0.808 | −.00116 |
| Control Core 1.590 inch | 1.592 | 72 | 45 | 66.1 | 0.796 | −.00112 |

The cores with the thin moisture barrier layer and the control cores were exposed to environments of about 100% humidity at 110° F. for one week (simulating an exposure of 6 weeks at room temperature). The 100% humidity environment was achieved by placing a water container in the oven. The results are as follows:

| | Change in Weight After 1 Week in Oven (Simulating 6 Weeks at Room Temperature) | % Change in Weight After 1 Week in Oven (Simulating 6 Weeks at Room Temperature) |
|---|---|---|
| Control Cores at 100% Humidity | +0.76 gram | +1.39% |
| Core with Thin Moisture Barrier Layer at 100% Humidity | +0.15 gram | +0.26% |

Hence, the results above show that golf balls made in accordance to the above invention show a significant gain in moment of inertia over the control cores (71.6 g·cm$^2$ as compared to 66.1 g·cm$^2$) and significant decrease in moisture absorption (0.15 gram as compared to 0.76 gram). The difference in specific gravity between the core 12 and the moisture vapor barrier layer 14 can be as high as 0.45 or higher. In accordance to one aspect of the invention, the Shore D hardness values for the core and moisture vapor barrier sub-assemblies have been measured less than about 50 and more specifically in the range of about 30–40. Alternatively, according to other aspects of the invention, the moisture barrier sub-assemblies may have Shore D hardness value of greater than 50, when more rigid materials are used to construct the moisture vapor barrier layer 14.

In accordance to a preferred embodiment of the invention, a golf ball with a solid PBD core with the thin moisture barrier layer, discussed immediately above, is covered by a thermoset urethane cover having a thickness from about 0.10 to about 0.080 inch, so long as the diameter of the ball does not exceed the USGA limit. While a thin cover having a thickness from about 0.010 to 0.040 inch is preferred for high swing speed players, a thicker cover having a thickness from about 0.040 to 0.080 inch and, more preferably, 0.050–0.070 inch may be employed. The use of this relatively thick thermoset urethane in this embodiment is advantageous for players with moderate swing speeds. These players will benefit from a high energy, large PBD core for distance off the tee and more spin, feel and playability for greenside play from the relatively thick thermoset urethane cover, without the moisture penetration problem normally associated with urethane covered, PBD core golf balls.

In accordance to another aspect of the present invention, the intermediate moisture vapor barrier layer 14 may be made from other suitable materials including (i) multi-layer thermoplastic films, (ii) blends of ionomers, polyvinyl alcohol copolymer and polyamides, and (iii) dispersions of acid salts of polyetheramines, among others.

Suitable multi-layer thermoplastic films include polypropylene films, which have been metallized or coated with PVDC and specifically modified polyester films such as those described in U.S. Pat. No. 6,200,511. The disclosure of the '511 patent is hereby incorporated herein by reference in its entirety. These multi-layer films preferably include a base layer of thermoplastic polyester and have at least one outer layer. The base thermoplastic polyester layer is preferably polyethylene teraphthalate (PET), polybutylene teraphthalate (PBT), polyethylene naphthalate (PEN), polycyclohexanedimethylene teraphthalate (PCDT), or polyethylene naphthalate bibenzoate (PENBB), among others. The outer layer is preferably composed of one or more copolyesters prepared from dicarboxylic acids, and diols or its derivatives, where the dicarboxylic acid is composed of a mixture of at least 35 mol % 2,6-naphthalate units, up to 44 mol % of teraphthalate units, and 1–20 mol % of isophthalate units and from 0–20 mol % of an aromatic dicarboxylic acid, which has been substituted with an alkali metal sulfo group, among others. Other suitable modified polyesters are disclosed in U.S. Pat. No. 5,506,014. The '014 patent is incorporated herein by reference in its entirety.

Other suitable multi-layer thermoplastic films include films with a polyolefin base layer such as polyethylene (PE), polypropolene (PP), ionomer, metallocene, etc. and an outer coating layer made from PVDC or ethylene vinyl alcohol (EVOH). Other suitable base layers include polyamide, polyester, polyurethane, polyvinyl chloride (PVC) or any materials found in columns 4–6 of the '100 patent, previously incorporated by reference. Additionally, other multi-layer polyolefin films including a base layer of PP and a non-heat sealable outer layer containing silicon oxide, such as those disclosed in U.S. Pat. No. 5,468,527 and references cited therein. The '527 patent and references cited therein are incorporated herein by reference in their entirety.

As stated above, suitable blends of ionomers, polyvinyl alcohol copolymer and polyamides include a thermoplastic resin composition comprising EVOH, ionomer and a polyamide. This composition is suitable for use as the intermediate moisture vapor barrier layer 14, as well as a coating on the outside of cover 16. A preferred composition comprises about 25% or more of an ionomer, about 25% or more of a polyvinyl alcohol copolymer and 1–50% polyamide. Examples of suitable compositions are disclosed in U.S. Pat. No. 6,011,115 and references cited therein. The '115 patent and references cited therein are incorporated by herein by reference in their entirety.

Also, suitable dispersions of acid salts of polyetheramines for use as the intermediate moisture vapor barrier layer 14, as well as a coating on the outside of cover 16, include stable aqueous dispersions of an acid salt of a polyetheramine prepared by at least partially neutralizing the polyetheramine with an acid as disclosed in U.S. Pat. No. 6,180,715. The disclosure of the '715 patent is incorporated by reference in its entirety.

Figure 3:
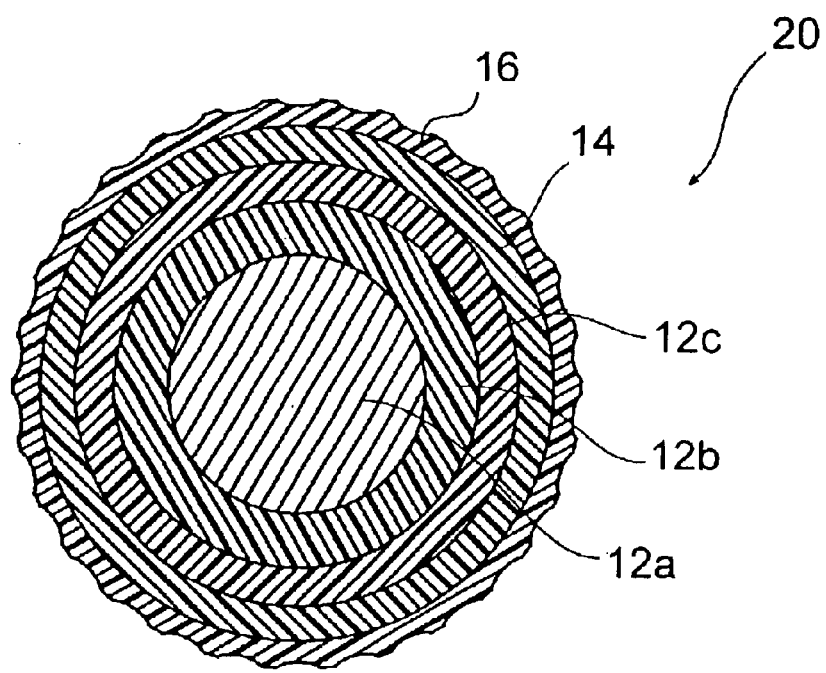
FIG. 3 is a cross-sectional view of another golf ball in accordance to the present invention showing a solid core with multiple wound layers surrounded by a thin moisture vapor barrier layer.

In accordance to yet another aspect of the invention, as shown in FIG. 3 golf ball 20 may have multiple layer core 12a, 12b and 12c, surrounded by intermediate layer 14 and dimpled cover 16. Core layers 12b and 12c may be an integral solid layer or discrete layers molded on each other. Alternatively, both outer core layers 12b and 12c could be wound layers, or one of these two layers may be a wound layer.

In another preferred embodiment, core layers 12b and 12c are wound layers that are chemically, physically or mechanically distinct from each other. In this embodiment, inner spherical core 12a may be a single-layer solid center, multi-layer core or a liquid filled core. Inner spherical core 12a can be constructed from the suitable core materials discussed above, and preferably has a diameter from about 0.5 to about 1.50 inch. Wound layer 12b may be made from various threads including, but not limited to, natural rubber, polyether urea (sold as LYCRA® by DuPont), polyester urea, polyester block copolymers (sold as HYTREL® by DuPont), polyethylene, polyamide, polyketon, poly (p-phenylene terephthalamide) (sold as KEVLAR® by DuPont), polyisoprene, among others. Wound layer 12c may be made from the same suitable threads listed immediately above, except that wound layers 12b and 12c should be made from different threads.

An advantage of this preferred embodiment is that the above listed suitable threads have different properties, such as density, diameter, elasticity, tensile strengths, etc. Hence, wound layers 12b and 12c may be wound at different tensions. One layer may be more compact or more tightly packed than the other layer when one thread has a smaller diameter than the other, thereby creating a gradient of a desired property for the golf ball. For example, surrounding a wound layer of highly tensioned polyisoprene thread layer with polyether urea thread layer creates a hard-soft gradient in the core. On the other hand, surrounding a polyisoprene thread layer with a high modulus layer such as KEVLAR® creates a soft-hard gradient.

Advantageously, the intermediate moisture vapor barrier layer 14 may surround one or both of the wound layers 12b and 12c to minimize moisture from penetrating into the innermost core 12a and the wound layers, especially when one or both of the wound layers or the innermost core are made from a rubber or polybutadiene material or from other materials that are degradable by moisture.

Figure 4:
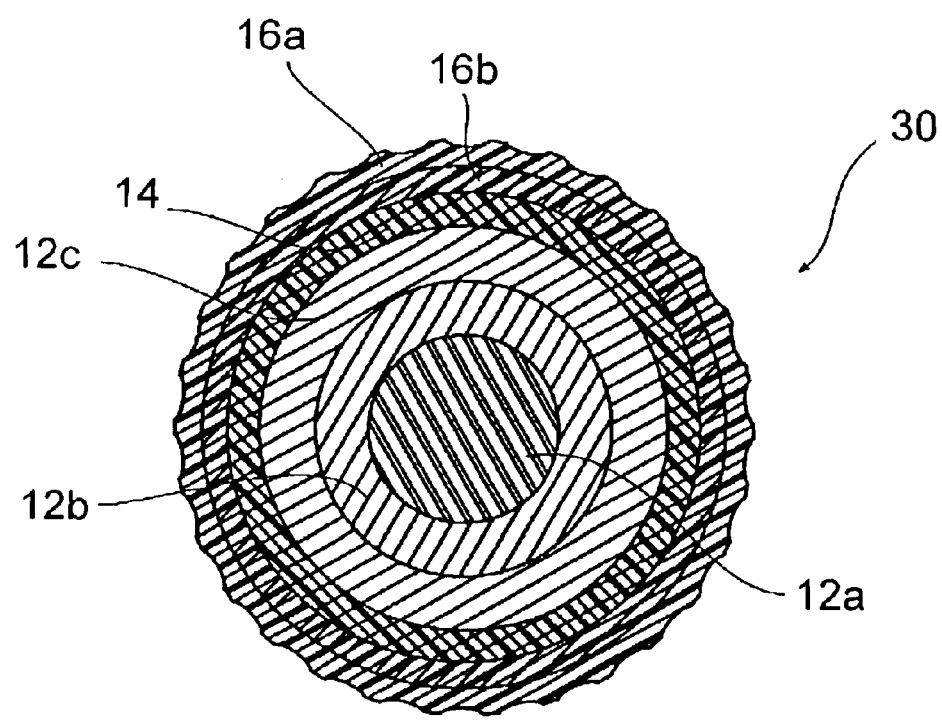
FIG. 4 is a cross-sectional view of another golf ball in accordance to the present invention showing a solid core with multiple wound layers surrounded by a thin moisture vapor barrier layer and a dual layer cover.
Figure 5:
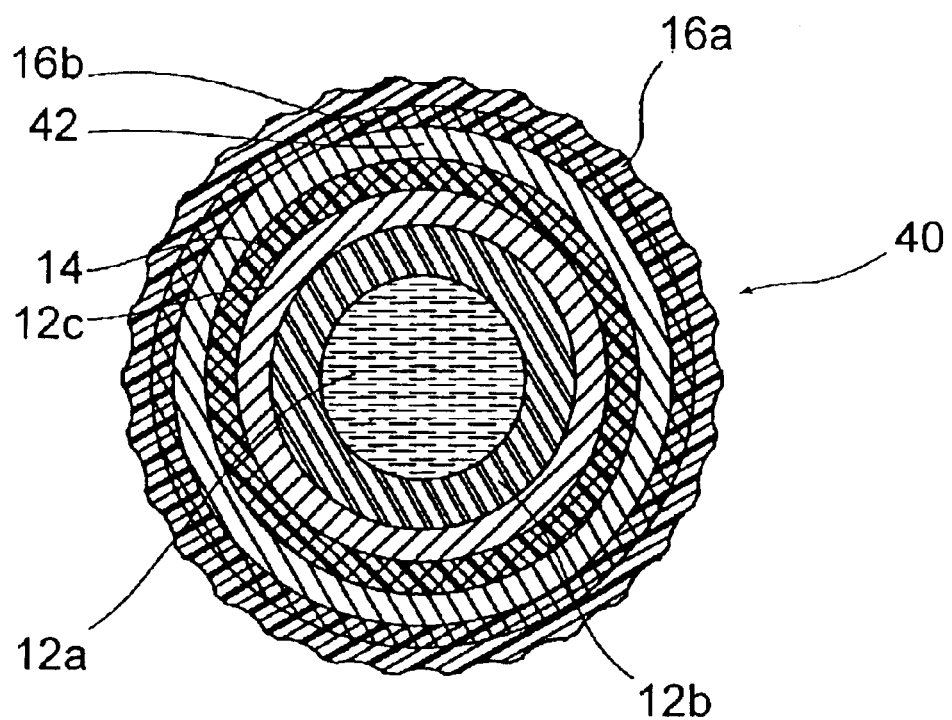
FIG. 5 is a cross-sectional view of another golf ball in accordance to the present invention a fluid filled core with multiple wound layers surrounded by at least one thin moisture vapor barrier layer and a cover.

In accordance to another aspect of the invention, as best illustrated in FIG. 4, golf ball 30 may have multiple layer core 12a, 12b and 12c surrounded by intermediate layer 14, similar to golf ball 20, discussed above. Golf ball 30 also has outer dimpled layer 16a and an inner cover layer 16b, wherein inner cover 16b may be a wound layer or a hoop stress layer. Alternatively, as illustrated in FIG. 5, golf ball 40 may have a liquid filled center core 12a, surrounded by a solid inner core layer 12b, which is surrounded by a solid or wound inner core layer 12c. Intermediate layer 14, as discussed above, preferably surrounds inner core layers 12a, 12b and 12c. Cover 16 again may have dimpled outer cover 16a and inner cover layer 16b. An optional intermediate layer 42 may also be provided, which could be solid or wound. Where a liquid core is used, the moisture vapor barrier layer may serve the added function of preventing moisture vapor from exiting the liquid core to the atmosphere.

Suitable fluids usable in the liquid filled cores in accordance with their specific gravities include air, aqueous solutions, liquids, gels, foams, hot-melts, other fluid materials and combinations thereof. Examples of suitable liquids include either solutions such as salt in water, corn syrup, salt in water and corn syrup, glycol and water or oils. The liquid can further include pastes, colloidal suspensions, such as clay, barytes, water or other liquid, or salt in water/glycol mixtures. Examples of suitable gels include water gelatin gels, hydrogels, water/methyl cellulose gels and gels comprised of copolymer rubber based materials such a styrene-butadiene-styrene rubber and paraffinic and/or naphthenic oil. Examples of suitable melts include waxes and hot melts. Hot-melts are materials, which at or about normal room temperatures are solid but at elevated temperatures become liquid. A high melting temperature is desirable since the liquid core is heated to high temperatures during the molding of the inner core, outer core, and the cover. Alternatively, the liquid can be a selective reactive liquid system, which combines to form a solid. Examples of suitable reactive liquids are silicate gels, agar gels, peroxide cured polyester resins, two part epoxy resin systems, peroxide cured liquid polybutadiene rubber compositions, reactive polyurethanes, silicones and polyesters. Additionally, suitable fluids also include low specific gravity liquid such as SAE 10 oil, SAE 30 oil, methanol, ethanol, ammonia, etc., or a high specific gravity liquid such as glycerin or carbon tetrachloride.

Figure 6:
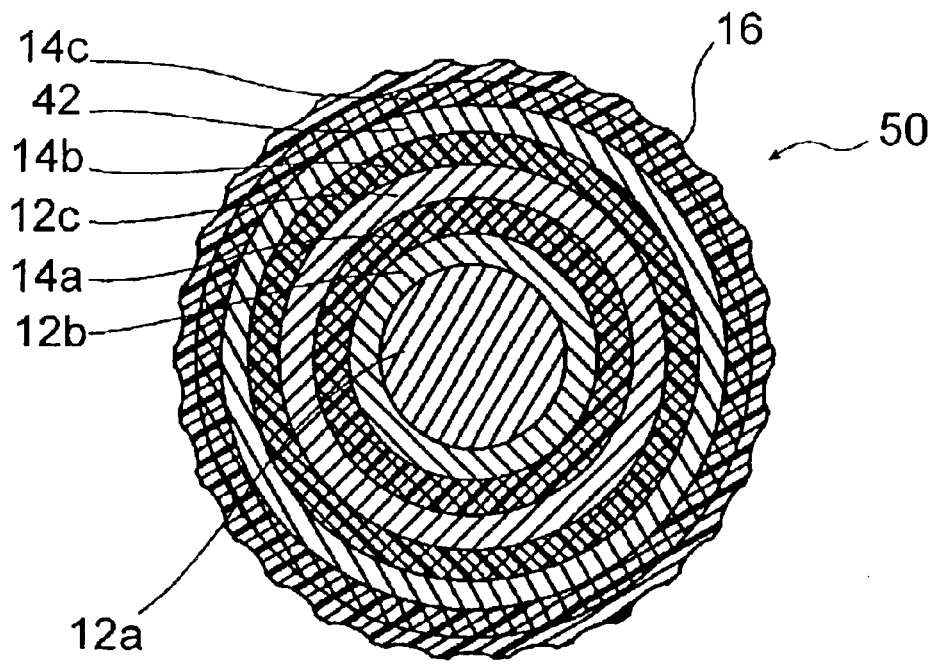
FIG. 6 is a cross-sectional view of another golf ball in accordance to the present invention showing a solid core surrounded by multiple wound or unwound intermediate layers, each intermediate layer being surrounded by a thin moisture vapor barrier layer.

Alternatively, as illustrated in FIG. 6, golf ball 50 may comprise multiple intermediate layers 14a, 14b and 14c, which have similar construction as intermediate layer 14 discussed above. As shown, intermediate layer 14a surrounds inner cores 12a and 12b; intermediate layer 14b surrounds layer 12c; and intermediate layer 14c surrounds optional intermediate layer 42. Advantageously, each intermediate layer protects a preselected portion of the core of the golf ball, such that if moisture vapor penetrates an outer moisture vapor barrier layer, the interior layers remain protected by the inner moisture vapor barrier layers.

In accordance to another aspect of the invention, the moisture vapor barrier layer 14 may be made by a number of methods. Non-limiting examples include, but are not limited to, the following methods: (1) Pre-formed semi-cured shells. A quantity of mixed stock of the preferred moisture vapor barrier material is placed into a compression mold and molded under sufficient pressure, temperature and time to produce semi-cured, semi-rigid half-shells. The half-shells are then place around a core (solid or wound) and the sub-assembly is cured in another compression molding machine to complete the curing process and to reach the desirable size. A cover is then formed on the sub-assembly by any known method to complete the fabrication of the ball; (2) Sheet stock and vacuum. Thin sheets of the mixed stock of the preferred moisture vapor barrier material are placed on the upper and lower platens of a compression-molded press. Suction force from a vacuum keeps the sheets tight against the mold cavities. A core (solid or wound) is placed in the bottom cavity above the vacuumed sheet. The sub-assembly is then cured in a compression molding press to cure the sub-assembly and to achieve the desirable size. A cover is then formed on the sub-assembly by any known method to complete the fabrication of the ball; and (3) Rubber injection molding. Mixed stock of the preferred moisture vapor barrier material is fed into an injection molding barrel and screw. The stock is then injected through a nozzle into a mold cavity and surrounds a core (solid or wound). The sub-assembly is then heated under pressure to cure the sub-assembly and to achieve the desirable size. A cover is then formed on the sub-assembly by any known method to complete the fabrication of the ball.

Other suitable manufacturing techniques include spraying, dipping, vacuum deposition, reaction injection molding, among others. The moisture vapor barrier layer 14 may also be made by a casting method, if the selected moisture barrier material is a castable material, including, but are not limited to, epoxy, silicones, acrylics, IPN's, polyurethane-ionomers, polyureas and polyesters. Furthermore, any number of fillers, fibers, flakes such as mica, metal, ceramic, graphite, etc., can be added the castable materials to make them more impervious to water vapor. A known two-pack casting method, such as the one disclosed in U.S. Pat. No. 5,897,884, can also be used. The '884 patent is hereby incorporated by reference in its entirety. Generally, in a two-pack casting method, the polyurethane material is formed by a reaction between polyurethane prepolymer and a curing agent. The polyurethane prepolymer itself is formed by a reaction between a polyol and a diisocyanate. A catalyst may be employed to promote the reaction between the curing agent and the polyurethane prepolymer. The mixing and casting sequence and the timing are controlled as discussed in the '884 patent. Furthermore, the mixed materials have a relatively limited shelf life due to the reaction of the isocyanate group with the other components after mixing. Precisely measured ratio of the components is desirable, because off-ratio mixing yields less desirable components.

In accordance to another aspect of the invention, a simplified casting method to produce the moisture vapor barrier layer 14 is provided. More particularly, this simplified method is usable to make any castable components of the golf ball, including the moisture vapor barrier layer, any intermediate layer, the innermost core or any portion of the cover. An example of this application is casting a blocked urethane moisture vapor barrier layer or any other layer onto a golf ball core.

A preferred embodiment of this method uses uretdiones or blocked isocyanates to form a single-pack urethane component. The single-pack blocked isocyanate system, which preferably comprises isocyanate combined with an amine or poloyl, is advantageously stable at room temperature. The application of heat causes the isocyanate to become unblocked or to react to form a urethane. No mixing or dynamically controlling the ratios of the components is required.

Uretdione castable materials can be pre-formulated as a single-pack system without premature reaction. The mixed single-pack material can be directly injected or poured into a mold, avoiding metering and mixing of multiple components. Parts can be made utilizing viscous or solid materials that previously could not be used with traditional two-pack systems. Advantageously, uretdiones and blocked isocyanates when combined with suitable reactive components can be milled into rubber stock for use with other manufacturing techniques, discussed above.

A non-limiting example of a single-pack system in accordance to the present invention is as follows. Finely ground uretdione is dispersed in a liquid polyol or polyamine in combination with a tin catalyst and cyclic amidine catalyst. A slurry is created. The slurry mixture is poured into a suitable golf ball mold to make the required part, e.g., core, intermediate layer or cover. The mold is then heated to reach the predetermined deblocking temperature of about 150–180° C., and the reaction is allowed sufficient time to complete. The cured component then can be removed from the mold for further processing, if necessary.

In another example, 3,5 dimethylpyrazole (DMP) blocked-IPDI is used in place of the uretdione in the above example. The mold is then heated to the deblocking temperature of about 140–160° C., and the reaction is allowed sufficient time to complete.

Non-limiting chemical structures of the single-pack system are shown below:

Formation of uretdiones:

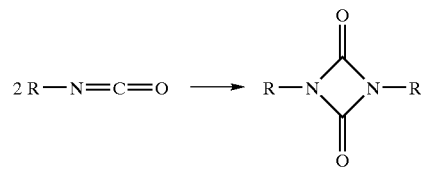

Preferred chemical structure of polyuretdione cross-linker:

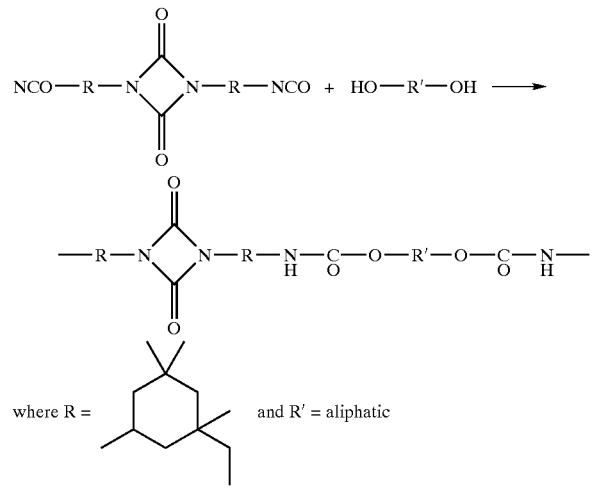

The preferred hardeners are uretdiones or a blocked isocyanates, where the blocking agent remains in the component as a solid once cast, such as DMP or triazole blocked isocyanates. The structures of the preferred blocking agents are:

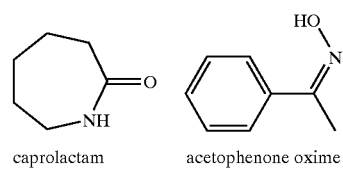

caprolactam    acetophenone oxime

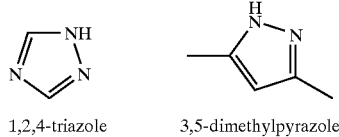

1,2,4-triazole    3,5-dimethylpyrazole

As stated above, the single-pack casting method can also be used to produce the innermost core, any intermediate layer or any other portion of the golf ball.

While various descriptions of the present invention are described above, it is understood that the various features of the present invention can be used singly or in combination thereof. Therefore, this invention is not to be limited to the specifically preferred embodiments depicted therein.

What is claimed is:

1. A method of casting a portion of a golf ball comprising the steps of:
   providing a single component comprising a uretoione that is blocked and stable at a first predetermined temperature and becomes unblocked at a second predetermined temperature, wherein said second predetermined temperature is higher than the first predetermined temperature;
   grinding uretdione;
   dispersing the ground uretdione in a liquid of polyol or polyamine;
   combining with at least one catalyst to create a slurry;
   pouring the slurry into a mold and heating the mold to the second predetermined temperature; and
   reacting said single component at the second predetermined temperature to form a surrounding layer.

2. The method of claim 1, wherein the single component is an uretdione or blocked isocyanate material.

3. The method of claim 1, wherein the step of providing the single component comprises the step of combining isocyanate with an amine or poloyl.

4. The method of claim 1, wherein the second predetermined temperature is in the range of about 150 to about 180° C.

5. The method of claim 1, wherein the second predetermined temperature is in the range of about 140 to about 180° C.

6. The method of claim 1, wherein the portion is an intermediate layer.

7. The method of claim 6, wherein the intermediate layer is a vapor barrier layer.

8. The method of claim 1, wherein the portion is a cover.

9. The method of claim 8, wherein the cover is a vapor barrier layer.

10. The method of claim 1, wherein the portion is a core.

11. A method of casting a portion of a golf ball comprising the steps of:
    grinding a uretdione having a first predetermined temperature at which the uretdione is blocked;
    dispersing the ground uretdione in a liquid of polyol or polyamine;
    combining with at least one catalyst to create a slurry; and
    pouring the slurry into a mold and heating the mold to a second predetermined temperature sufficient to cause the uretdione to become unblocked, the second temperature being higher than the first predetermined temperature, to form a surrounding layer.

12. A method of casting a portion of a golf ball comprising the steps of:
    providing a single component comprising 3,5 diemethylpyrazole blocked-IPOI that is blocked and stable at a first predetermined temperature and becomes unblocked at a second predetermined temperature, wherein said second predetermined temperature is higher than the first predetermined temperature;
    grinding 3,5 dimethylpyrazole blocked-IPDI;
    dispersing the ground 3,5 dimethylpyrazole blocked-IPDI in a liquid of polyol or polyamine:
    combining with at least one catalyst to create a slurry;
    pouring the slurry into a mold and heating the mold to the second predetermined temperature; and
    reacting said single component at the second predetermined temperature to form a surrounding layer.

* * * * *